US008869247B2

(12) United States Patent  (10) Patent No.: US 8,869,247 B2
Matsumura  (45) Date of Patent: Oct. 21, 2014

(54) APPARATUS, SYSTEM, AND NON-TRANSITORY COMPUTER READABLE MEDIUM STORING PROGRAM

(75) Inventor: Ryoji Matsumura, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 200 days.

(21) Appl. No.: 13/610,272

(22) Filed: Sep. 11, 2012

(65) Prior Publication Data

US 2013/0239179 A1  Sep. 12, 2013

(30) Foreign Application Priority Data

Mar. 6, 2012  (JP) ................................ 2012-049010

(51) Int. Cl.
*H04L 29/06* (2006.01)
(52) U.S. Cl.
USPC ............................................................ 726/4
(58) Field of Classification Search
USPC ............................................................ 726/4
See application file for complete search history.

(56) References Cited

U.S. PATENT DOCUMENTS 7,593,122 B2 * 9/2009 Watanabe et al. ............ 358/1.14
7,789,303 B2 * 9/2010 Fukasawa ..................... 235/382
7,840,999 B2 * 11/2010 Hamaguchi ..................... 726/17
8,019,918 B2 * 9/2011 Otsuka et al. ................... 710/36
8,505,089 B2 * 8/2013 Maeda et al. .................... 726/17
8,544,085 B2 * 9/2013 Fusaka ............................ 726/19
2003/0145219 A1 * 7/2003 Cossel et al. .................. 713/200

FOREIGN PATENT DOCUMENTS

| JP | A-2002-103743 | 4/2002 |
| JP | A-2002-169433 | 6/2002 |
| JP | A-2005-063146 | 3/2005 |

* cited by examiner

*Primary Examiner* — Michael S McNally
(74) *Attorney, Agent, or Firm* — Oliff PLC

(57) ABSTRACT

An apparatus with a single function or plural functions includes a user information receiving unit that receives user information about a user; a request unit that requests use permission information from a server; a receiving unit that receives the use permission information transmitted from the server; a memory that stores the received use permission information; a use permission determining unit that performs a first determination process and a second determination process; and an operation controller that, when the use of the function is permitted in the first determination process, performs control such that operations other than a predetermined operation are available before the second determination process is performed and, when it is determined that the function permitted to be used in the first determination process is also permitted to be used in the second determination process, performs control to permit the user to use all operations of the function.

6 Claims, 11 Drawing Sheets

SYSTEM 1

SYSTEM 1

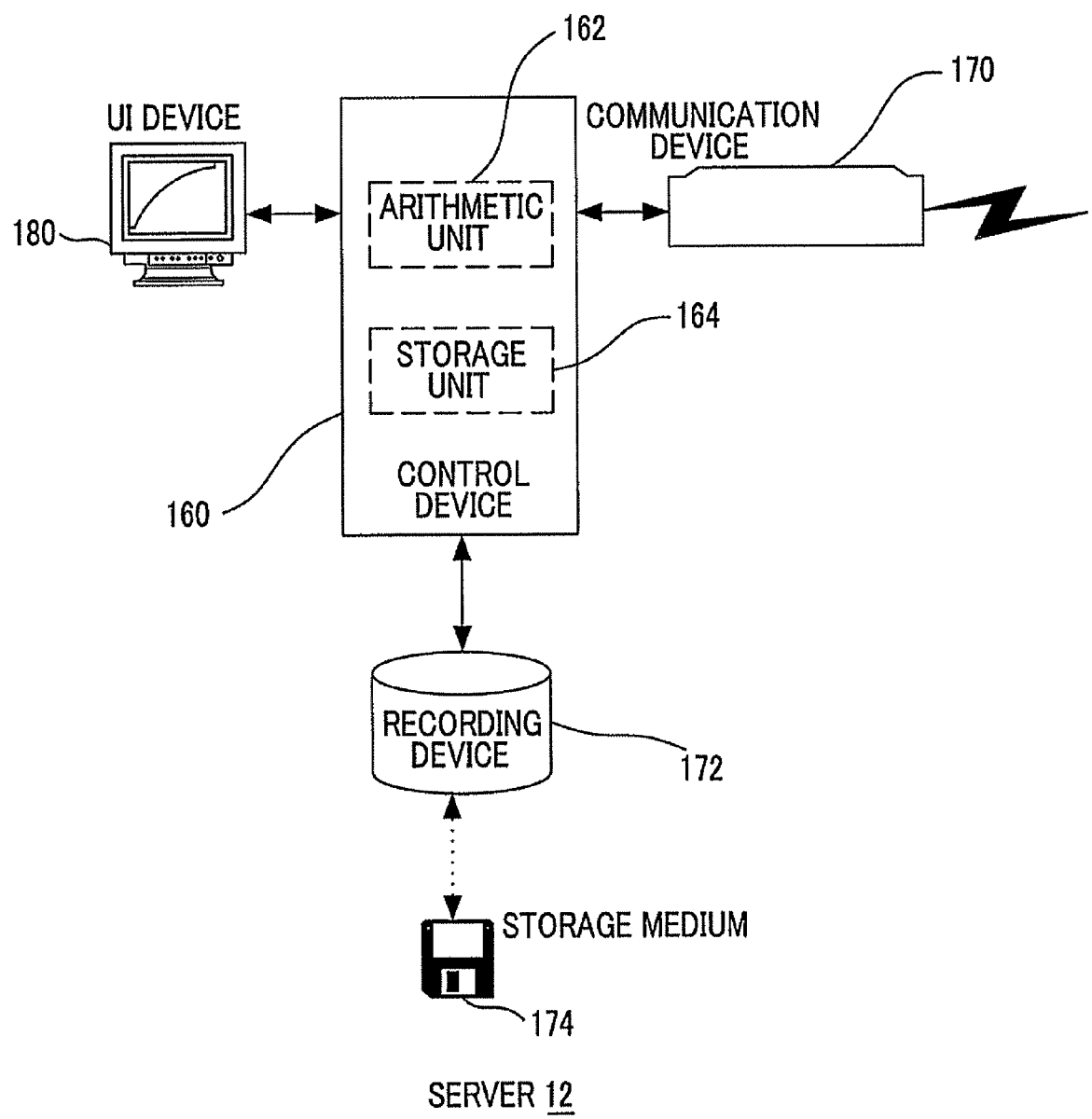

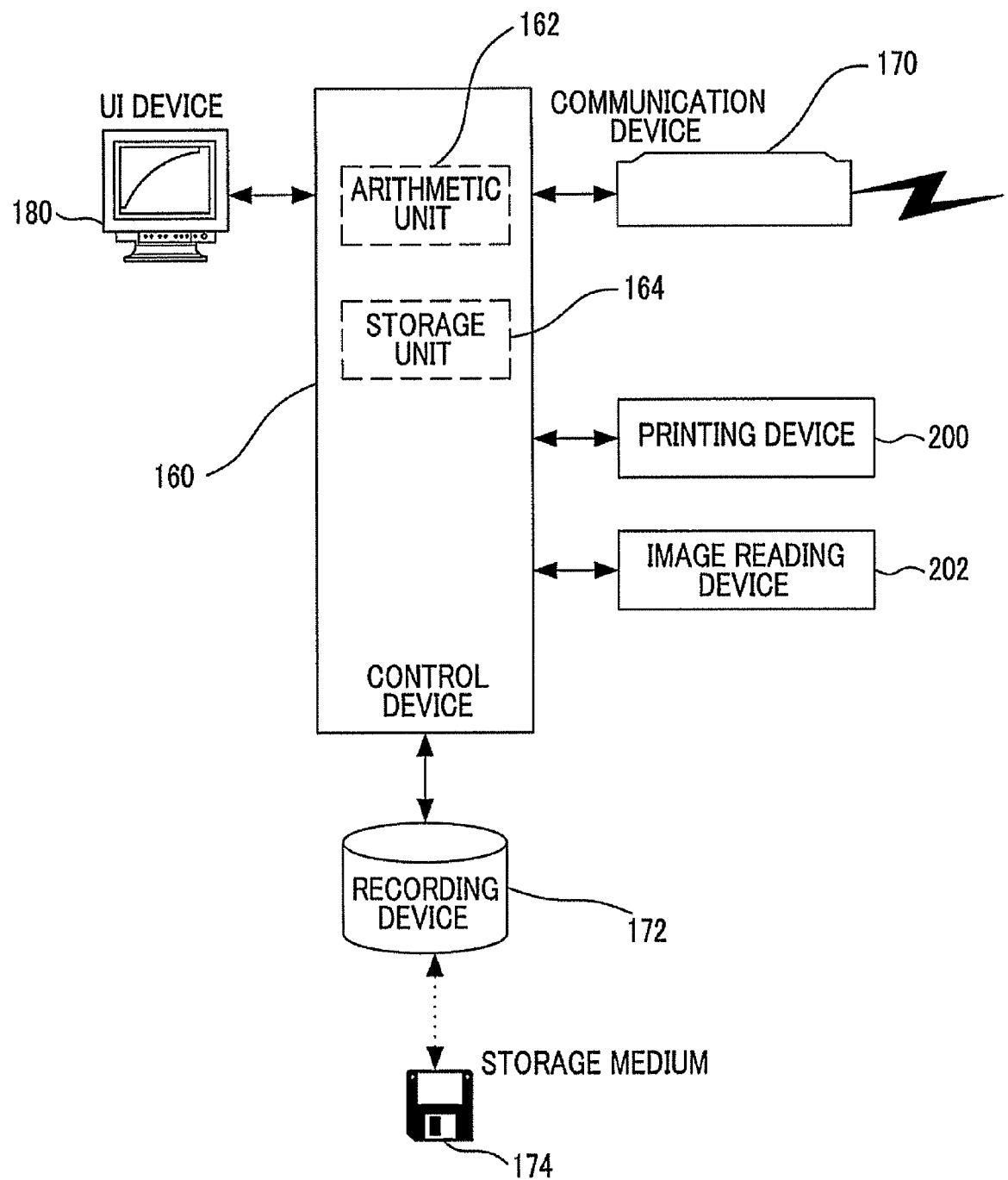

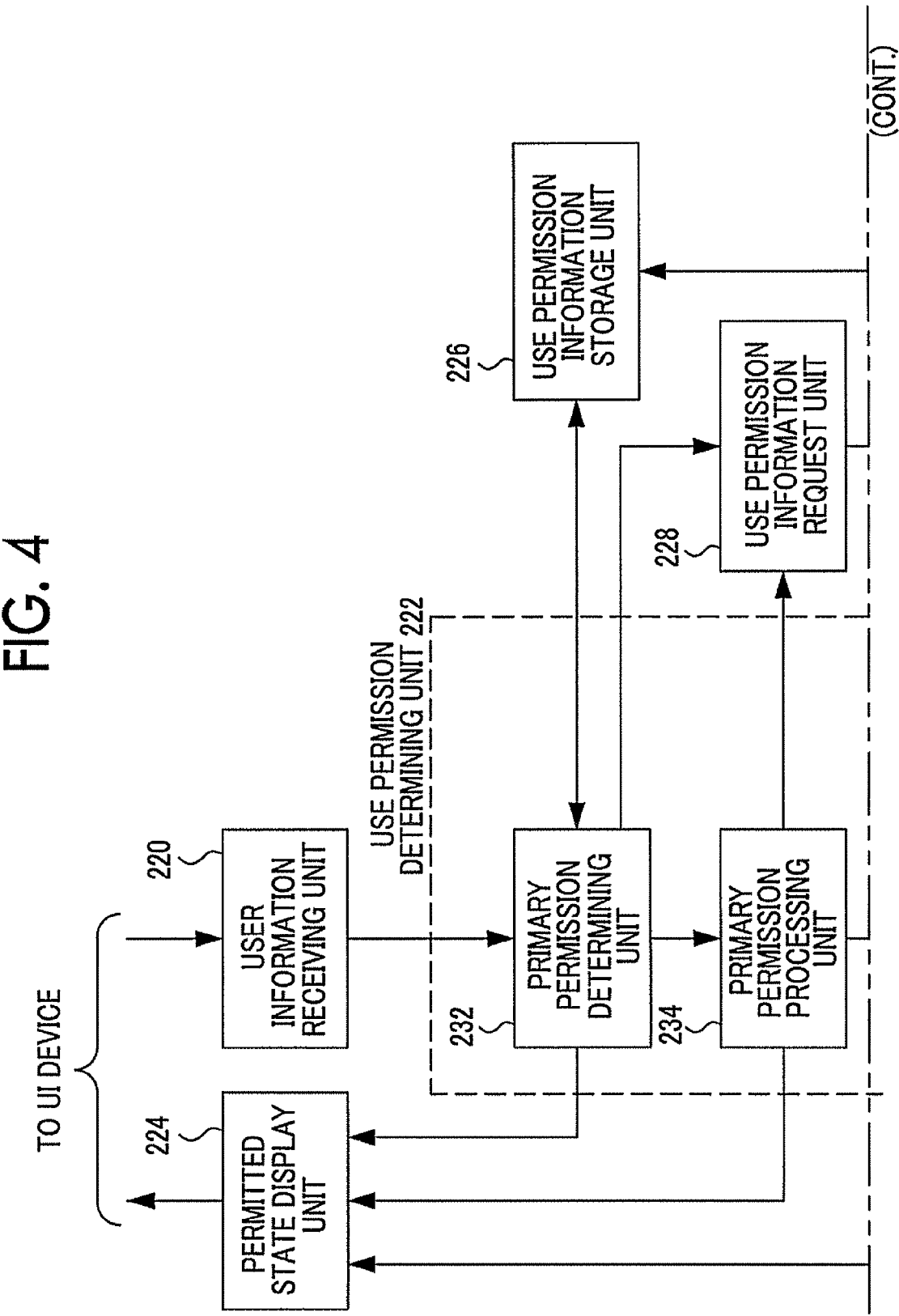

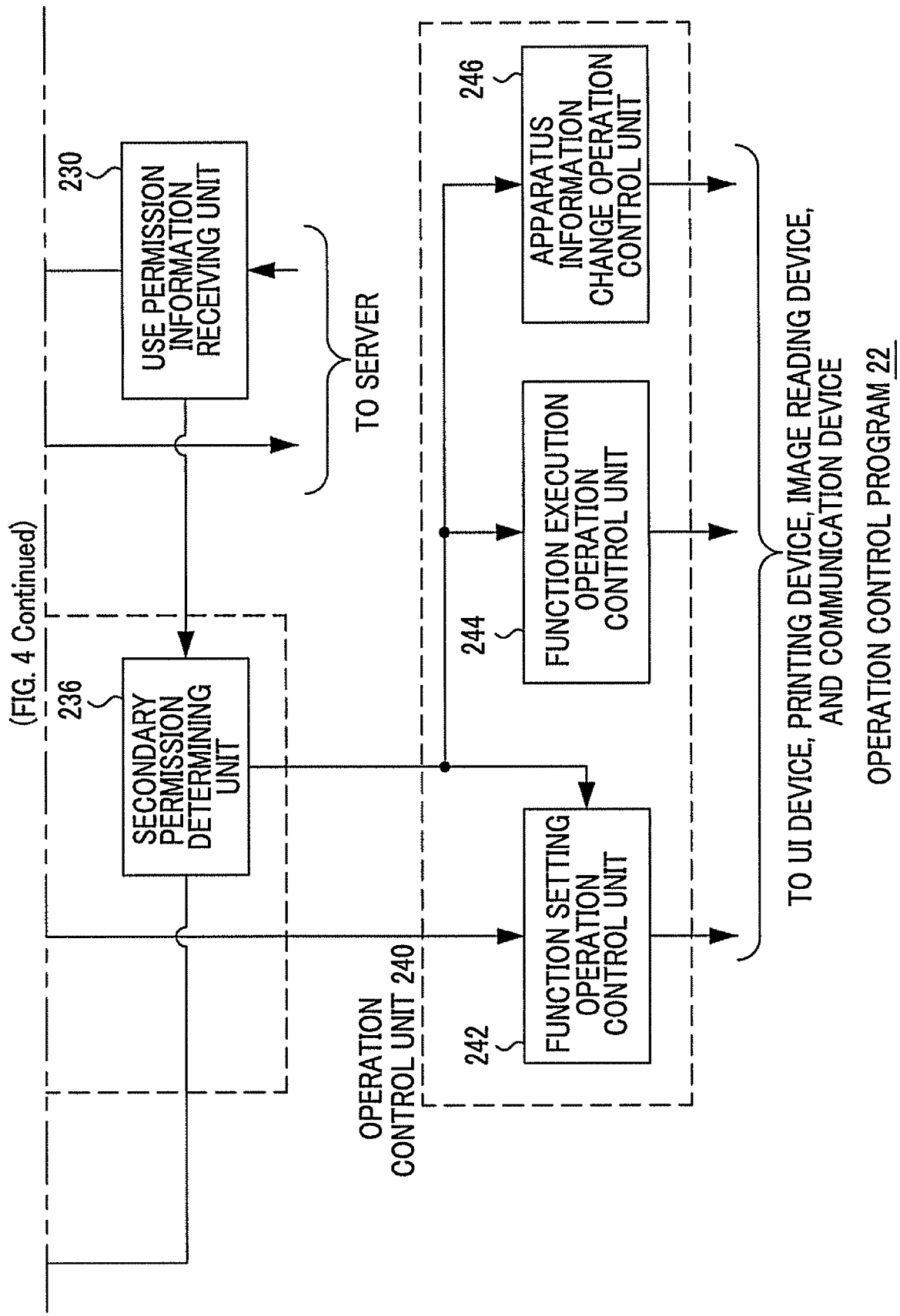

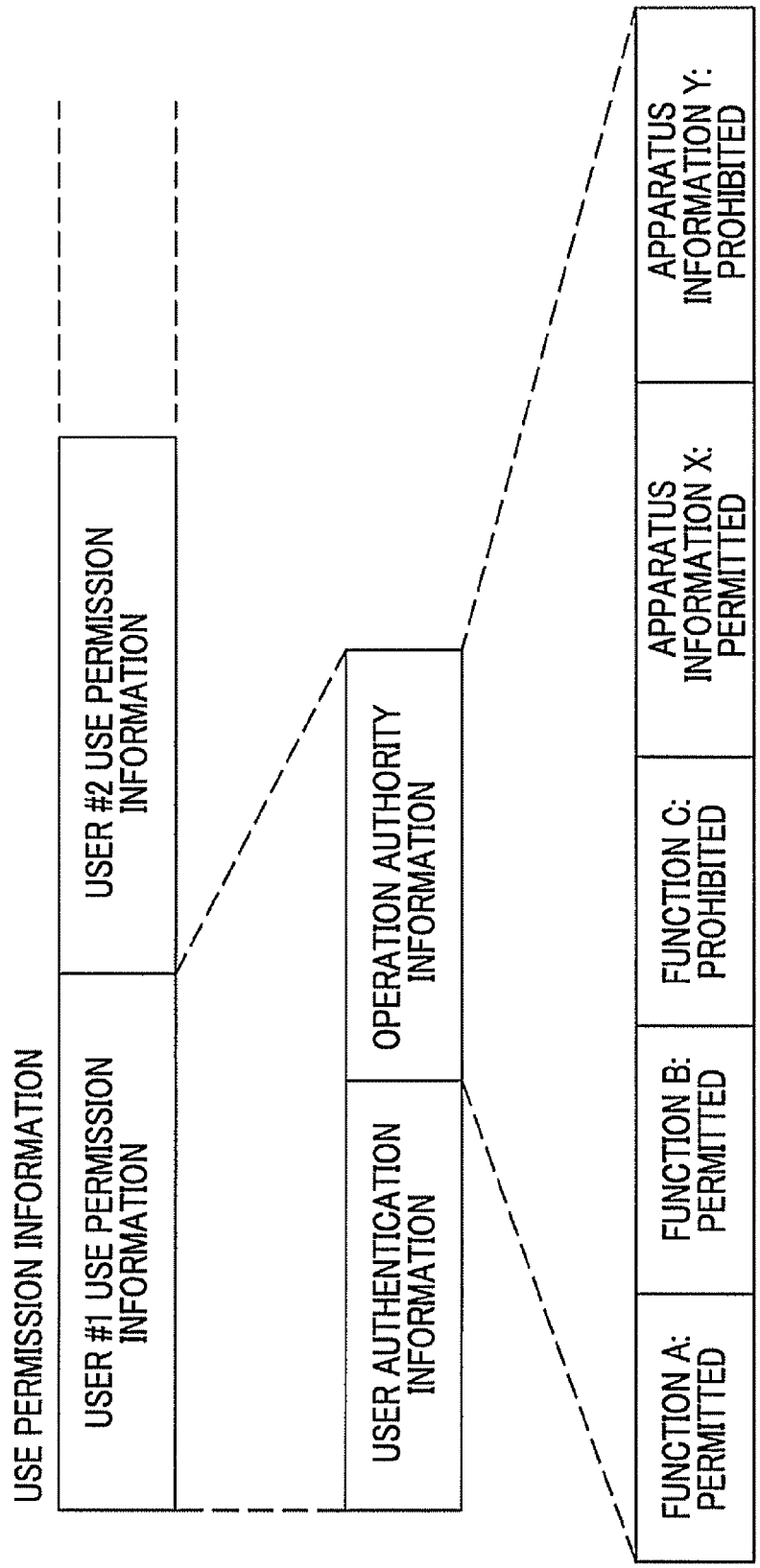

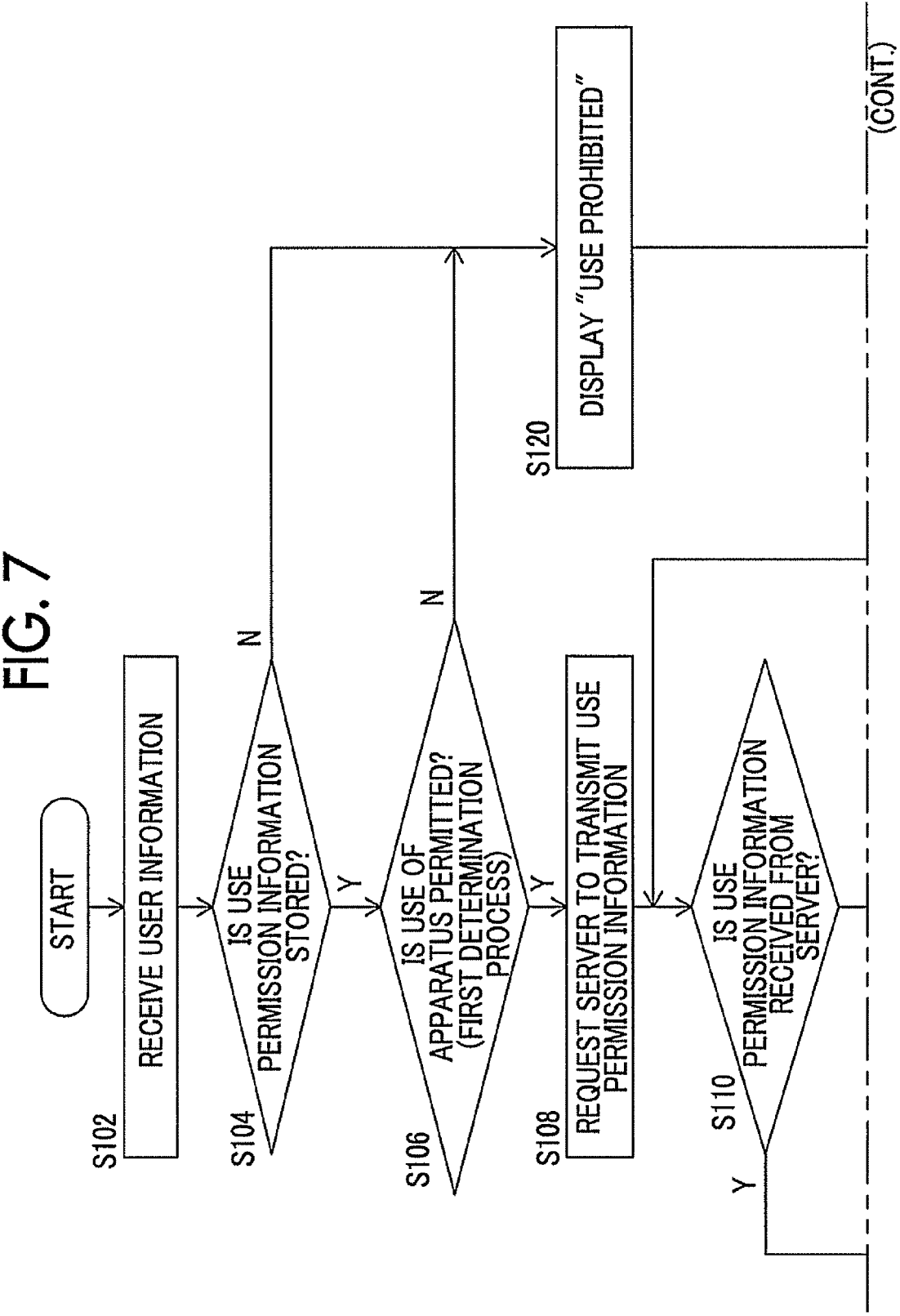

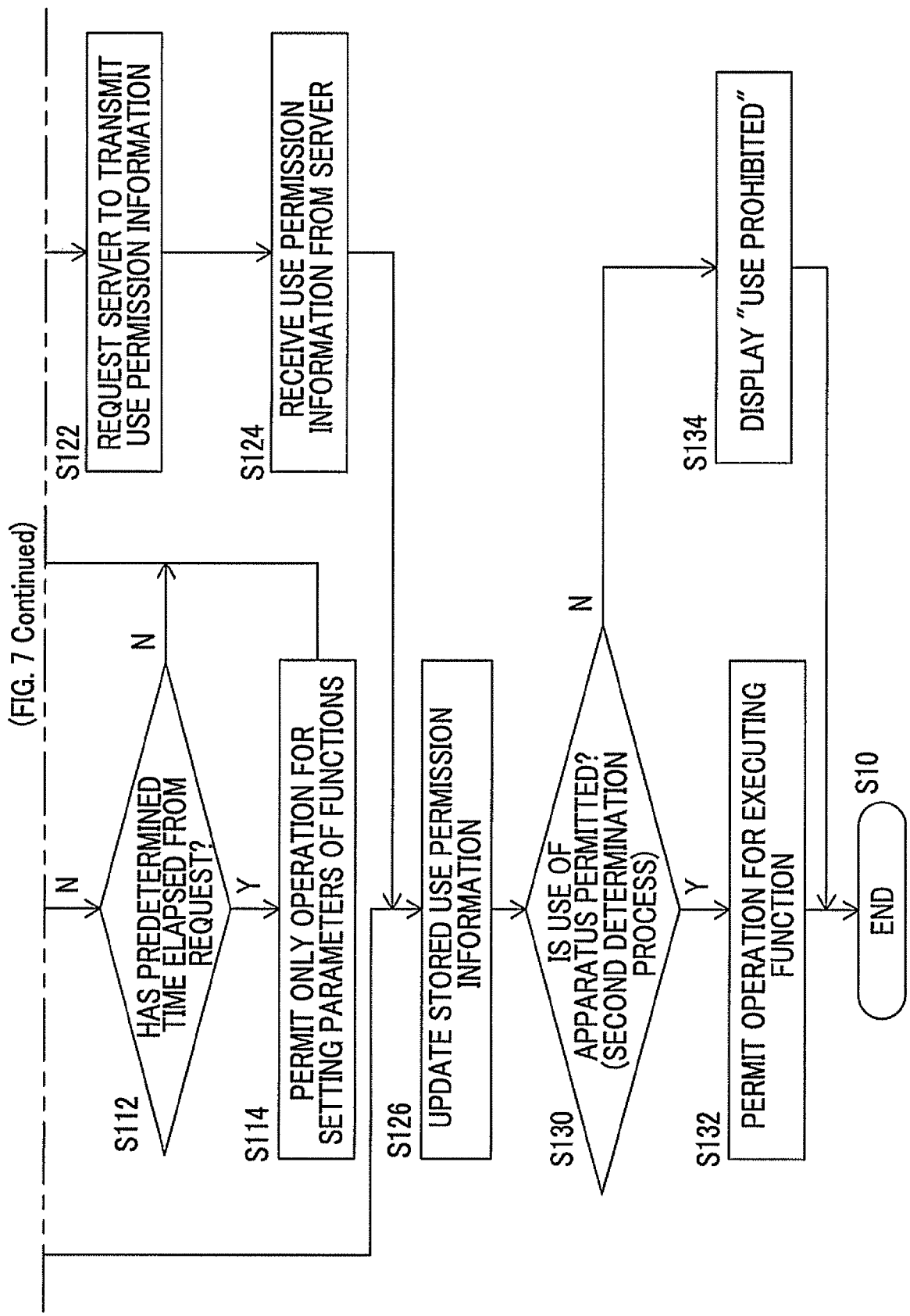

US 8,869,247 B2

APPARATUS, SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2012-049010 filed Mar. 6, 2012.

BACKGROUND

Technical Field

The present invention relates to an apparatus, a system, and a non-transitory computer readable medium storing a program.

SUMMARY

According to an aspect of the invention, there is provided an apparatus with a single function or plural functions including: a user information receiving unit that receives user information about a user in response to an operation by the user; a request unit that requests use permission information, indicating whether the user is permitted to use the function, from a server which stores the use permission information; a receiving unit that receives the use permission information transmitted from the server in response to the request from the request unit; a memory that stores the received use permission information; a use permission determining unit that performs a first determination process of determining whether the user is permitted to use the function on the basis of the user information received by the user information receiving unit and the use permission information which has been stored in the memory before the user information is received and a second determination process of determining whether the user is permitted to use the function on the basis of new use permission information which is received by the receiving unit in response to a request from the request unit and the user information after the first determination process; and an operation controller that, when the determining unit determines that the use of the function is permitted in the first determination process, performs control such that operations other than a predetermined operation among the operations related to the function which is permitted to be used are available before the second determination process is performed by the determining unit and, when it is determined that the function whose use is determined to be permitted in the first determination process by the determining unit is also permitted to be used in the second determination process, performs control such that the user is permitted to use all operations of the function.

BRIEF DESCRIPTION OF THE DRAWINGS

Exemplary embodiments of the present invention will be described in detail based on the following figures, wherein:

FIG. 2 is a diagram illustrating the hardware structure of a server shown in FIG. 1;

FIG. 3 is a diagram illustrating the hardware structure of an image forming apparatus shown in FIG. 1;

FIG. 4 is a block diagram illustrating an operation control program which operates on the image forming apparatus according to this exemplary embodiment;

FIG. 5 is a diagram illustrating an example of use permission information;

FIG. 7 is a flowchart illustrating the process of the image forming apparatus according to this exemplary embodiment.

DETAILED DESCRIPTION

Hereinafter, an exemplary embodiment will be described.

Figure 1:
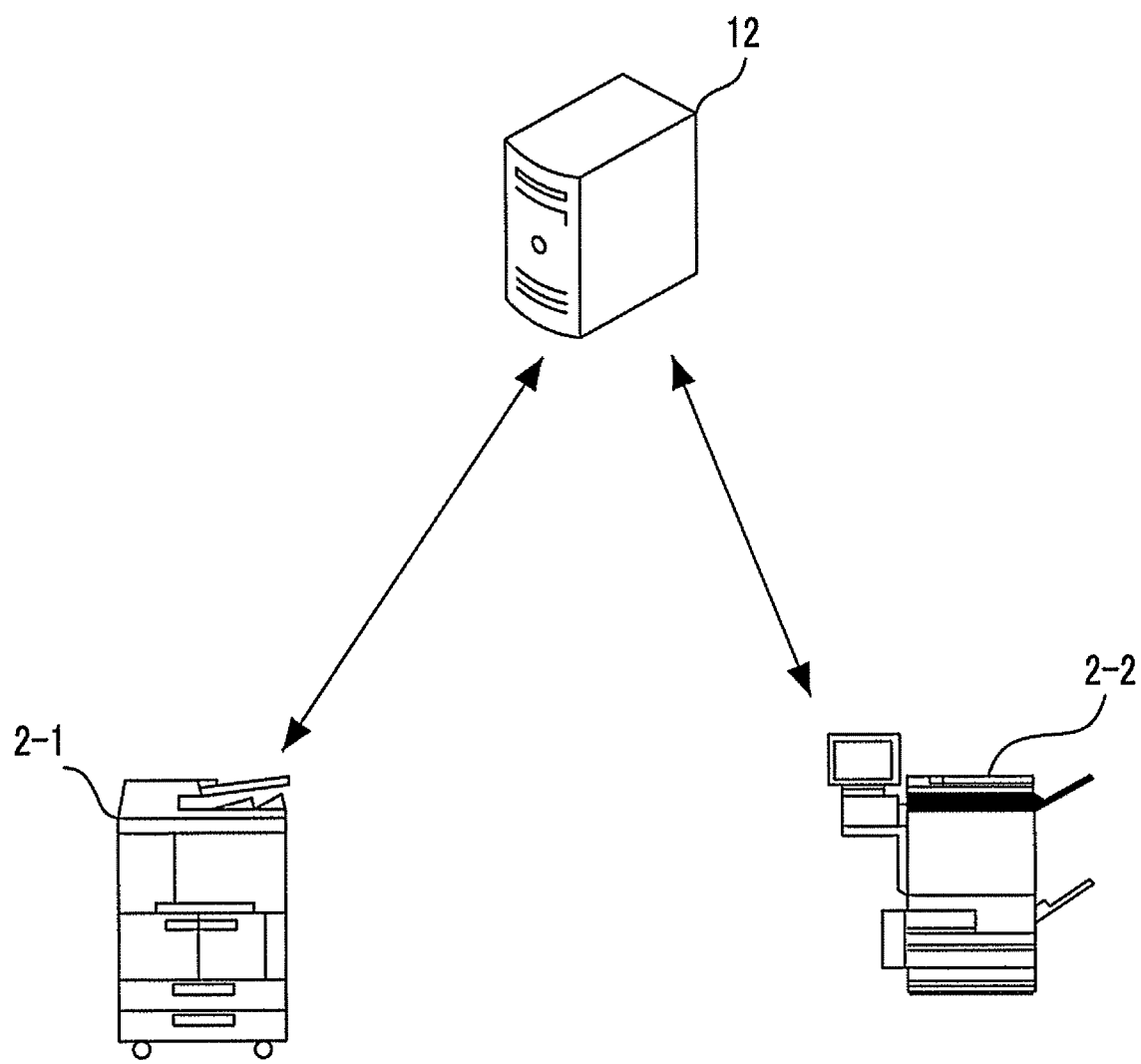
FIG. 1 is a diagram illustrating a system according to an exemplary embodiment.

FIG. 1 is a diagram illustrating a system 1 according to this exemplary embodiment.

As shown in FIG. 1, the system 1 includes a server 12 and image forming apparatuses 2-1 and 2-2.

Hereinafter, when plural components, such as the image forming apparatuses 2-1 and 2-2, are described without being individually specified, they are simply referred to as, for example, image forming apparatuses 2.

In this exemplary embodiment, one server 12 is provided. However, two or more servers 12 may be provided. In this exemplary embodiment, two image forming apparatuses 2 are provided. However, one or three or more image forming apparatuses 2 may be provided.

The server 12 and the image forming apparatus 2 are connected to each other through a network, such as a Local Area Network (LAN).

The server 12 is, for example, an authentication server, collectively manages the user's authority to use the image forming apparatuses 2-1 and 2-2, and responds to an authentication request from the image forming apparatus 2.

The server 12 stores use permission information (which will be described below with reference to FIG. 5) indicating whether the use of the image forming apparatus 2 by the user is permitted and transmits the stored information to the image forming apparatus 2, which is a request source, in response to a request from the image forming apparatus 2.

The image forming apparatus 2 has plural functions, such as a printing function, a scanning function, and facsimile function, sets parameters for each function in response to the operation by the user, and executes each function according to the set parameters.

In this case, first, the image forming apparatus 2 receives user information (for example, user identification information and a password) input by the operation by the user (authentication process).

The image forming apparatus 2 requests the server 12 to transmit the use permission information indicating whether the user related to the received user information is permitted to use the image forming apparatus 2, using the received user information.

The image forming apparatus 2 determines whether to permit operations related to each of the above-mentioned functions, on the basis of the use permission information received from the server 12 in response to the request.

In addition, the image forming apparatus 2 stores the use permission information received from the server 12 in a storage unit, such as a cache memory. When the same user operates the image forming apparatus 2 again later, the image forming apparatus 2 determines whether to permit the operations related to each of the above-mentioned functions on the basis of the use permission information stored in the storage unit, such as a cache memory, before requesting the use permission information from the server 12 (or after requesting the use permission information and before receiving new use permission information).

FIG. 2 is a diagram illustrating the hardware structure of the server 12 shown in FIG. 1.

As shown in FIG. 2, the server 12 includes a control device 160 including an arithmetic unit 162, such as a CPU, and a storage unit 164, such as a memory, a communication device 170 that communicates with the image forming apparatus 2 through the network, a recording device 172, and a user interface device (UI device) 180.

That is, the server 12 includes a hardware component serving as a computer that may process information and communicate with other processing apparatuses or terminals.

In the following description, substantially the same components and processes are denoted by the same reference numerals.

The UI device 180 includes, for example, a display device, such as a Liquid Crystal Display (LCD) display device or a Cathode Ray Tube (CRT) display device, and a keyboard, and a touch panel.

FIG. 3 is a diagram illustrating the hardware structure of the image forming apparatus 2 shown in FIG. 1.

As shown in FIG. 3, the image forming apparatus 2 includes a control device 160 including, for example, an arithmetic unit 162 and a storage unit 164, a communication device 170 that communicates with the server 12 through the network, a recording device 172, a UI device 180, a printing device 200, and an image reading device 202.

The printing device 200 is, for example, a printer and prints, for example, text data or image data on a recording medium, such as paper.

The image reading device 202 is, for example, a scanner, reads an image from the recording medium, and converts the image into image data.

That is, the image processing apparatus 2 includes a hardware component serving as a computer that may process information and communicate with the server or the terminal.

The communication device 170 may have a facsimile function of transmitting image data to other terminals through the network, such as a communication line.

In addition, the image forming apparatus 2 may include an identification card reading device that reads user information stored in a user identification card when receiving the user information using the user identification card (for example, an ID card).

FIG. 4 is a block diagram illustrating an operation control program 22 that operates on the image forming apparatus 2 according to this exemplary embodiment.

As shown in FIG. 4, the operation control program 22 includes a user information receiving unit 220, a use permission determining unit 222, a permitted state display unit 224, a use permission information storage unit 226, a use permission information request unit 228, a use permission information receiving unit 230, and an operation control unit 240.

The use permission determining unit 222 includes a primary permission determining unit 232, a primary permission processing unit 239, and a secondary permission determining unit 236.

The operation control unit 240 includes a function setting operation control unit 242, a function execution operation control unit 244, and an apparatus information change operation control unit 246.

The operation control program 22 is provided to the image forming apparatus 2 through, for example, a storage medium 174 (FIG. 3), loaded to the storage unit 164, and executed on an OS (not shown) which is installed on the image forming apparatus 2, specifically using the hardware resources of the image forming apparatus 2.

In the operation control program 22, the user information receiving unit 220 receives the user information (for example, the user identification information and the password) which is input by the operation of the UI device 180 by the user.

Specifically, when using the image forming apparatus 2, first, the user operates the UI device 180 of the image forming apparatus 2 to input user identification information, such as a user ID, and the password.

The user information receiving unit 220 receives the input user identification information and password and outputs them to the use permission determining unit 222.

When receiving the user information from the user information receiving unit 220, the primary permission determining unit 232 of the use permission determining unit 222 determines whether the use permission information corresponding to the user related to the user information is stored in the use permission information storage unit 226.

When the use permission information is not stored in the use permission information storage unit 226, the primary permission determining unit 232 outputs the user information to the use permission information request unit 228. A case in which the use permission information is stored in the use permission information storage unit 226 will be described below.

In addition, when the use permission information is not stored in the use permission information storage unit 226, the primary permission determining unit 232 outputs information indicating that the use permission information is not stored to the permitted state display unit 224.

In this case, the permitted state display unit 224 performs a process of displaying, on the UI device 180, information indicating that the use of the image forming apparatus 2 is not permitted since the user is not authenticated (for example, a message "You are not permitted to use the apparatus since you are not authenticated. Please wait a moment while the server is being contacted).

The use permission information request unit 228 transmits request information (authentication request) including the received user information, the identification information (apparatus identification information) of the image forming apparatus 2, and a command (use permission information request command) to request the server 12 to transmit the use permission information to the image forming apparatus 2 to the server 12 through the network.

FIG. 5 is a diagram illustrating an example of the use permission information.

As shown in FIG. 5, the use permission information is provided for each user. For example, user #1 use permission information, user #2 use permission information, are provided.

The use permission information of each user includes user authentication information and operation authority information.

The user authentication information indicates whether the user is permitted to use the image forming apparatus 2 and includes the user identification information and the password.

The operation authority information indicates the function of the image forming apparatus 2 which is permitted to be used by the user and the function thereof which is prohibited from being used.

For example, in the example shown in FIG. 5, user #1 is permitted to use a function A (for example, a printing function) and a function B (for example, a scanning function), but is prohibited from using a function C (for example, a facsimile function). In addition, user #1 is permitted to change apparatus information X, but is prohibited from changing apparatus information Y.

The apparatus information is different from parameters set when an operation for each function, such as a printing function, is performed and means various kinds of settings and various kinds of information of the image forming apparatus 2. For example, the apparatus information is an address table or a confidential box.

In addition, a change in the apparatus information means the addition, deletion, and correction of various kinds of settings and various kinds of information. For example, the change in the apparatus information means the editing of the address table, the addition and deletion of the confidential box, or the deletion of a document in the confidential box.

The server 12 stores the use permission information shown in FIG. 5 for each of the image forming apparatuses 2-1 and 2-2 and collectively manages the authority of the user to use the image forming apparatuses 2-1 and 2-2.

In addition, the server 12 updates the use permission information in response to the operation of, for example, the system administrator.

For example, for the use of the image forming apparatus 2-1 by a given user, the operation of the function A is permitted, but the operation authority information of the use permission information may be changed such that the operation of the function A is prohibited by the operation of, for example, the system administrator.

When the use of all functions of the image forming apparatus 2-1 by a given user is prohibited, the use permission information of the user for the image forming apparatus 2-1 may be deleted.

When receiving the request information from the image forming apparatus 2, the server 12 determines the image forming apparatus 2 which transmits the request information on the basis of the apparatus identification information. For example, when it is determined that the request information is received from the image forming apparatus 2-1, the server 12 processes the use permission information managed for the image forming apparatus 2-1.

In addition, the server 12 checks the user information included in the request information and the user authentication information included in the use permission information which is stored in the server 12.

Specifically, for example, the server 12 determines whether the user identification information of the user information included in the request information is identical to the user identification information of the user authentication information included in the use permission information and determines whether the password of the user information included in the request information is identical to the password of the user authentication information included in the use permission information.

When the user identification information items and the passwords are identical to each other, the server 12 transmits the use permission information corresponding to the checked user authentication information to the image forming apparatus 2, which is a request source, through the network.

On the other hand, when it is determined that the user identification information items and the passwords are not identical to each other (that is, the use permission information including the user authentication information which is identical to the user identification information and the password of the user information included in the request information is not stored), the server 12 transmits a notice indicating that the use of the image forming apparatus 2 is prohibited (notice indicating the prohibition of use) to the image forming apparatus 2, which is a request source.

The use permission information receiving unit 230 (FIG. 4) receives the use permission information or the notice indicating the prohibition of use from the server 12 and outputs it to the secondary permission determining unit 236 of the use permission determining unit 222.

In addition, the use permission information receiving unit 230 transmits the received use permission information to the use permission information storage unit 226.

The use permission information storage unit 226 performs, for example, a process of storing data in the cache memory and stores the use permission information received from the server 12.

When receiving the notice indicating the prohibition of use, the secondary permission determining unit 236 determines that the user is not authenticated and transmits information indicating the prohibition of use to the permitted state display unit 224.

In this case, the permitted state display unit 224 displays information indicating the prohibition of use (for example, a message "Authentication fails. You are not permitted to use the apparatus") on the UI device 180. In this case, it is difficult for the user to operate the image forming apparatus 2 any longer.

When receiving the use permission information from the server 12, the secondary permission determining unit 236 determines that the user is authenticated.

The secondary permission determining unit 236 searches for the operation authority information of the use permission information and determines the function which is permitted to be operated and the apparatus information which is permitted to be changed in the operation authority information of the use permission information.

In addition, the secondary permission determining unit 236 outputs a command (secondary permission command) to permit the operation of the function which is permitted to be operated and a change the apparatus information which is permitted to be changed in the operation authority information to the operation control unit 240.

When receiving the secondary permission command, the operation control unit 240 performs a process for controlling the hardware components shown in FIG. 3, such as the UI device 180, the printing device 200, the image reading device 202, and the communication device 170 such that the operation permitted in the secondary permission command is made available.

When the secondary permission command is output to the operation control unit 240, the secondary permission determining unit 236 outputs information indicating that the operation of the image forming apparatus 2 is available to the permitted state display unit 224.

In this case, the permitted state display unit 224 performs a process of displaying the information indicating that the operation of the image forming apparatus 2 is available (for example, a message "Operation is available") on the UI device 180.

A case in which the primary permission determining unit 232 of the use permission determining unit 222 receives the user information from the user information receiving unit 220 and determines that the use permission information is stored in the use permission information storage unit 226 will be described.

The primary permission determining unit 232 checks the user information and the user authentication information included in the use permission information which is stored in the use permission information storage unit 226.

Specifically, for example, the primary permission determining unit 232 determines whether the user identification information of the user information is identical to the user identification information of the user authentication information included in the use permission information which is stored in the use permission information storage unit 226, and determines whether the password of the user information included in the user information is identical to the password of the user authentication information included in the use permission information which is stored in the use permission information storage unit 226.

When it is determined that the user identification information items and the passwords are not identical to each other, similarly to the above-mentioned process, the primary permission determining unit 232 outputs the user information to the use permission information request unit 228 and outputs information indicating that the user identification information items and the passwords are not identical to each other to the permitted state display unit 224. The subsequent process is the same as that when the use permission information is not stored in the use permission information storage unit 226.

On the other hand, when it is determined that the user identification information items and the passwords are identical to each other, the primary permission determining unit 232 outputs the user information and the use permission information stored in the use permission information storage unit 226 to the primary permission processing unit 234.

The primary permission processing unit 234 outputs the user information to the use permission information request unit 228 and the use permission information request unit 228 transmits the request information to the server 12.

In addition, the primary permission processing unit 234 searches for the operation authority information of the use permission information stored in the use permission information storage unit 226 and determines the function which is permitted to be operated in the operation authority information of the use permission information.

After a predetermined time has elapsed from the transmission of the request information by the use permission information request unit 228 and before the use permission information receiving unit 230 receives new use permission information from the server 12, the primary permission processing unit 234 outputs, to the function setting operation control unit 242, a command (primary permission command) to permit an operation for setting the parameters related to the functions which are permitted to be operated in the operation authority information of the use permission information stored in the use permission information storage unit 226, among the operations for the functions.

When receiving the primary permission command, the function setting operation control unit 242 performs a process for controlling the hardware components of the image forming apparatus 2, such as the UI device 180, such that the operation for setting the parameters related to the function which is permitted in the primary permission command is permitted.

That is, the primary permission determining unit 232 checks the user information and the use permission information stored in the use permission information storage unit 226. Before new use permission information is received from the server 12, an operation for setting the parameters related to various functions of the image forming apparatus 2 is permitted, but an operation for performing the functions (for example, in the case of the printing function, an operation for performing printing) is prohibited. In addition, an operation of changing the operation information is prohibited.

The function setting operation control unit 242 permits the operation for setting the parameters related to various functions and access to the server 12 is continuously performed on the background while the user is setting the parameters.

For the function which is not permitted to be operated by the primary permission processing unit 234, the function setting operation control unit 242 performs control such that the user may not perform the operation for setting the parameters even in this stage.

When the use permission information shown in FIG. 5 is stored in the use permission information storage unit 226, user #1 may set the parameters of the function A (for example, a printing function), but may not perform the function A. In addition, user #1 may not perform any operation for the function C (for example, facsimile).

Furthermore, user #1 may not change the apparatus information.

When the primary permission command is output to the function setting operation control unit 242, the primary permission processing unit 234 outputs information indicating that only the operation for setting the parameters related to various functions of the image forming apparatus 2 is permitted to the permitted state display unit 224.

In this case, the permitted state display unit 224 performs a process for displaying, on the UI device 180, information indicating that only the operation for setting the parameters related to various functions of the image forming apparatus 2 is permitted (for example, a message "Only the operation for setting the parameters related to the function is available, but the execution of the function is not available").

For example, a predetermined time which is measured after the use permission information request unit 228 transmits the request information may be set such that the user feels that a waiting time until new use permission information is received from the server 12 is long.

In addition, the predetermined time may be set to 0 second. In this case, the operation for setting the parameters related to various functions is available at the same time as the use permission information request unit 228 transmits the request information.

When receiving the use permission information or the notice indicating the prohibition of use from the server 12 in response to the request from the use permission information request unit 228 by the process of the primary permission processing unit 234, the use permission information receiving unit 230 outputs the received use permission information or the received notice indicating the prohibition of use to the secondary permission determining unit 236.

As described above, the use permission information receiving unit 230 outputs the received use permission information to the use permission information storage unit 226. In this way, the use permission information stored in the use permission information storage unit 226 is updated.

As described above, when receiving the use permission information from the server 12, the secondary permission determining unit 236 determines that the user is authenticated.

As described above, the secondary permission determining unit 236 searches for the operation authority information of the use permission information, determines the function which is permitted to be operated and the apparatus information which is permitted to be changed in the operation authority information of the use permission information, and outputs the secondary permission command to the function setting operation control unit 242, the function execution operation control unit 244, and the apparatus information change operation control unit 246.

The function execution operation control unit 244 performs a process for controlling the hardware of the image forming apparatus 2 such that an operation for performing the function which is permitted to be operated in the secondary permission command is made available.

The apparatus information change operation control unit 246 performs a process for controlling the hardware of the image forming apparatus 2 such that a change in the apparatus information which is permitted to be changed in the secondary permission command is made available.

When the function which is permitted to set the parameters in the primary permission command is not permitted to be operated in the secondary permission command (that is, the operation of the function is prohibited in the operation authority information), the function setting operation control unit 242 performs a process for controlling the hardware components of the image forming apparatus 2, such as the UI device 180, such that the operation for setting the parameters related to the function is prohibited.

In this case, the function setting operation control unit 242 performs control such that the set parameters are cleared until the use permission information is received from the server 12.

That is, when the operation authority information of the use permission information is updated and the operation of the function which has been permitted to be operated is prohibited by the update, the parameter setting operation is available until the use permission information is received from the server 12. However, after the use permission information is received from the server 12, all operations for the function are not available.

For example, it is assumed that user #1 has been permitted to operate the function A, but the operation authority information of the use permission information about the user #1 is updated in the server 12 after the use permission information about user #1 is stored in the use permission information storage unit 226 such that the operation of the function A is prohibited.

In this case, since the operation of the function A is permitted in the use permission information (use permission information before update) stored in the use permission information storage unit 226, the parameter setting operation is available (the operation for performing the function A is not available) until the use permission information is received from the server 12. However, after the use permission information (updated use permission information) is received from the server 12, user #1 may not operate the function A (including the parameter setting operation).

When receiving the notice indicating the prohibition of use, the secondary permission determining unit 236 determines that the user is not authenticated and outputs information indicating the prohibition of use to the permitted state display unit 224, as described above.

The permitted state display unit 224 displays the information indicating the prohibition of use, information indicating the end of the operation, or a request for re-authentication on the UI device 180.

In addition, when receiving the notice indicating the prohibition of use, the secondary permission determining unit 236 outputs the notice indicating the prohibition of use to the function setting operation control unit 242.

When receiving the notice indicating the prohibition of use, the function setting operation control unit 242 performs control such that the parameter setting operation which has been permitted is prohibited.

The process of the primary permission determining unit 232 and the primary permission processing unit 234 determining whether the use of the image forming apparatus 2 is permitted or not on the basis of the use permission information stored in the use permission information storage unit 226 is referred to as a first determination process, and the process of the secondary permission determining unit 236 determining whether the use of the image forming apparatus 2 is permitted or not on the basis of the use permission information from the server 12 is referred to as a second determination process.

Figure 6A:
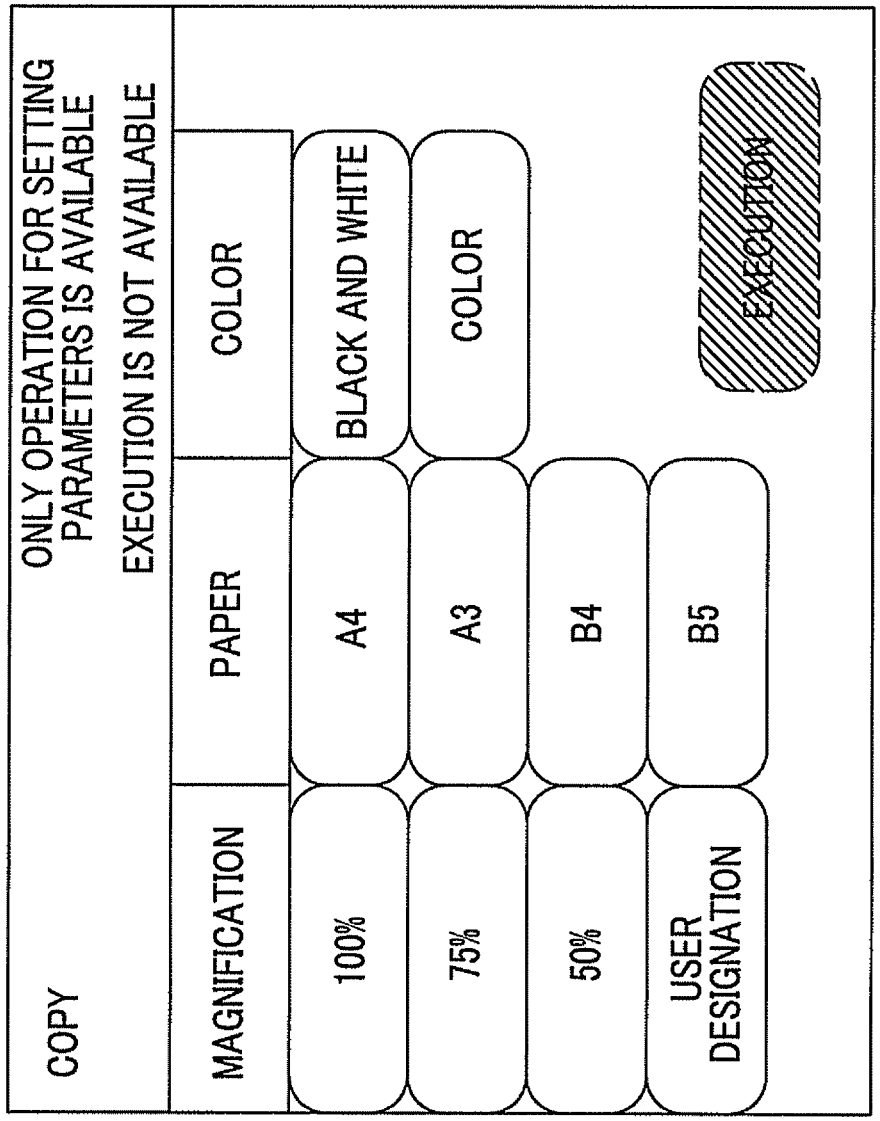
FIGS. 6A to 6C are diagrams illustrating a first determination process and a second determination process using an operation screen displayed on a UI apparatus.
Figure 6B:
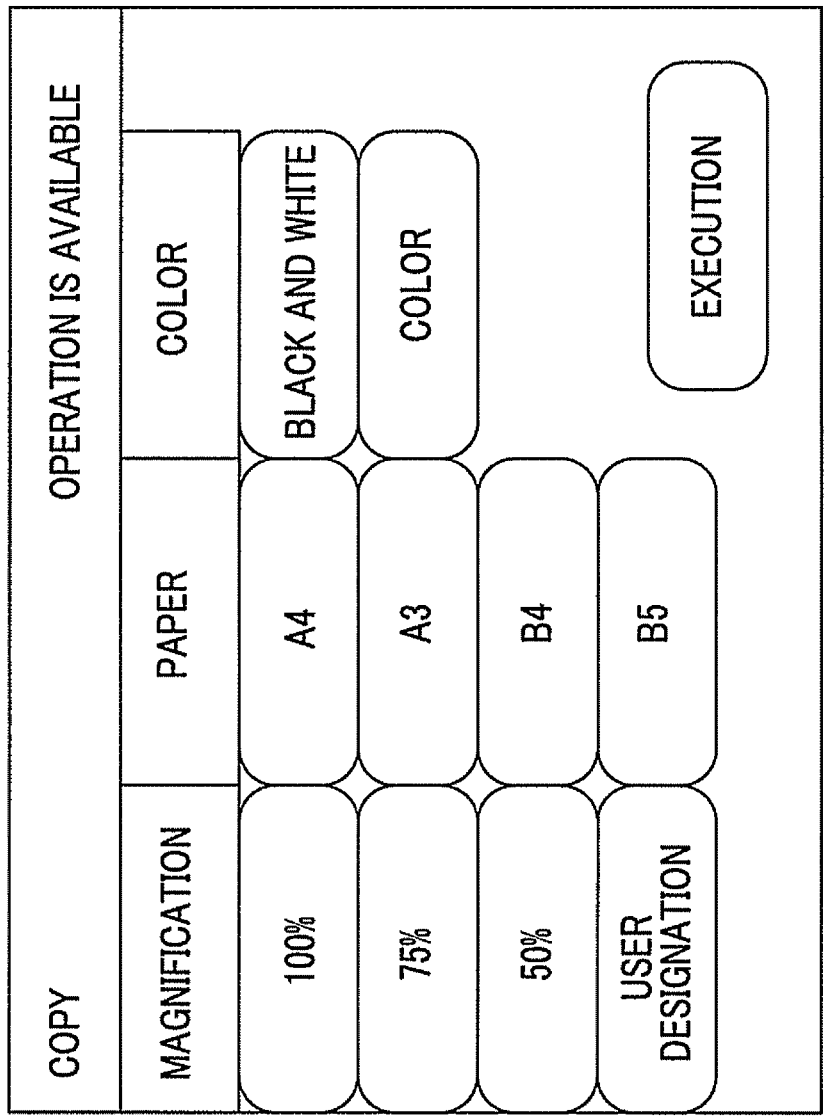
Figure 6C:
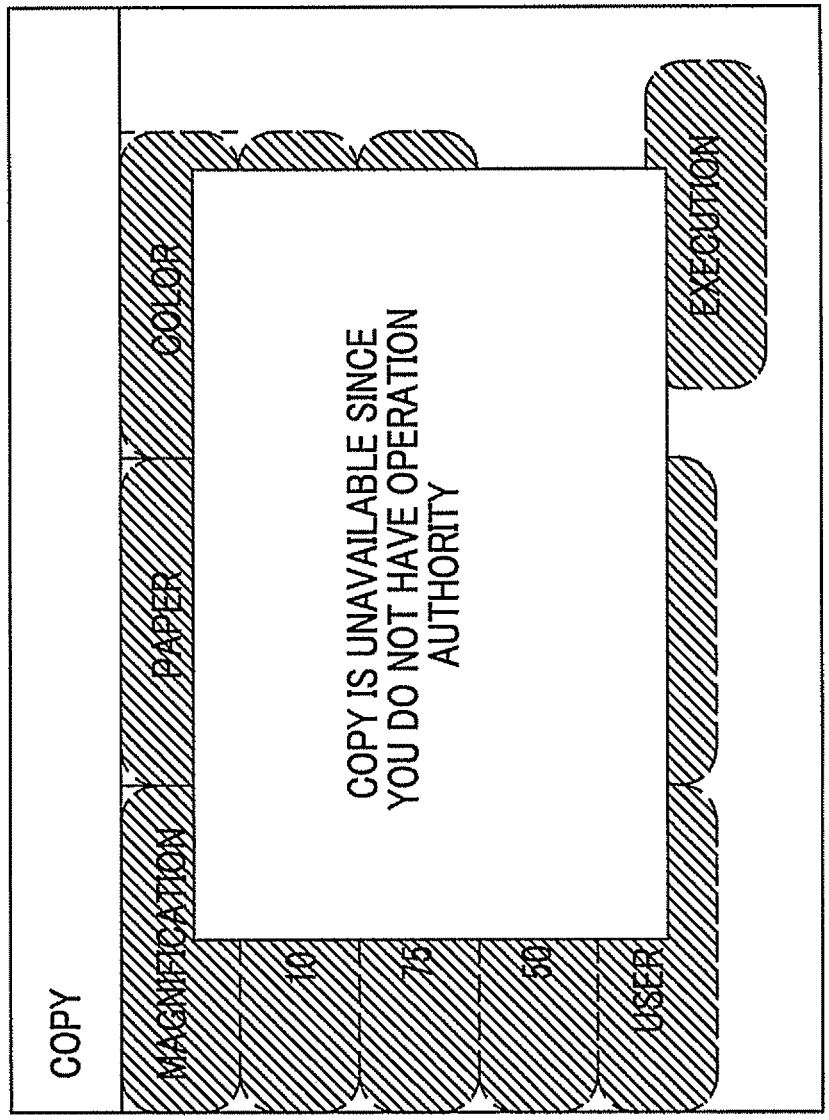

FIGS. 6A to 6C are diagrams illustrating the first determination process and the second determination process using an operation screen displayed on the UI device 180.

FIGS. 6A to 6C show an example of the operation screen for operating the copy function.

When it is determined that the operation of the copy function of the image forming apparatus 2 is permitted in the first determination process, an operation for setting the parameters of the copy function, such as the setting of magnification, the setting of a paper size, and the designation of a color, is available, as shown in FIG. 6A.

However, since an execution button is deleted or grayed out, it is impossible for the user to press the execution button and to perform the copy function.

In the case of an apparatus in which the execution button is not provided on the operation screen (when the execution button is provided as hardware), even when the user presses the execution button, for example, a message "Execution is unavailable since permission to use has not been granted" is displayed on the UI device 180 and the copy function is not performed.

Then, when it is determined that the operation of the copy function of the image forming apparatus 2 is permitted in the second determination process, the execution button is displayed on the operation screen, as shown in FIG. 6B.

Therefore, the user may press the execution button to perform the copy function, in addition to the operation of setting the parameters of the copy function.

When it is determined that the operation of the copy function of the image forming apparatus 2 is not permitted in the second determination process, all buttons on the operation screen are grayed out as shown in FIG. 6C and it is impossible for the user to perform the copy function.

In this case, even though the parameter setting operation other than the copy operation is available, the user may not perform any operation of the copy function.

FIG. 7 is a flowchart (S10) illustrating the process of the image forming apparatus 2 according to this exemplary embodiment.

The order of the following steps may be appropriately changed and all steps are not necessarily needed.

In Step 102 (S102), the user information receiving unit 220 receives the user information.

In Step 104 (S104), the primary permission determining unit 232 determines whether the use permission information which corresponds to the user related to the user information in the use permission information storage unit 226.

When the use permission information is stored, the process proceeds to S106. When the use permission information is not stored, the process proceeds to S120.

In Step 106 (S106), the primary permission determining unit 232 and the primary permission processing unit 234 determine whether the use of the image forming apparatus 2 and the operation of various functions are permitted on the basis of the use permission information stored in the use permission information storage unit 226.

When the use of the image forming apparatus 2 and the operation of various functions are permitted, the process proceeds to S108. When the use of the image forming apparatus 2 and the operation of various functions are not permitted, the process proceeds to S120.

In Step 108 (S108), the use permission information request unit 228 transmits the request information to the server 12 and requests the server 12 to transmit the use permission information.

In Step 110 (S110), the use permission information receiving unit 230 determines whether the use permission information is received from the server 12. When the use permission information is received from the server 12, the process proceeds to S130. When the use permission information is not received from the server 12, the process proceeds to S112.

In Step 112 (S112), the primary permission processing unit 234 determines whether a predetermined time has elapsed from the transmission of the request information by the use permission information request unit 228. When it is determined that the predetermined time has elapsed, the process proceeds to S114. When it is determined that the predetermined time has not elapsed, the process returns to S110.

In Step 114 (S114), the primary permission processing unit 234 outputs the primary permission command to the function setting operation control unit 242, and the function setting operation control unit 242 performs a process such that an operation for setting the parameters related to the function which is permitted in the primary permission command is available.

In Step 120 (S120), the permitted state display unit 224 displays information indicating that the use of the image forming apparatus 2 (or a specific function) is not available on the UI device 180.

In Step 122 (S122), the use permission information request unit 228 transmits the request information to the server 12 and requests the use permission information from the server 12.

In Step 124 (S124), the use permission information receiving unit 230 receives the use permission information from the server 12.

In Step 126 (S126), the use permission information storage unit 226 stores the use permission information from the server 12, thereby updating the use permission information.

In Step 130 (S130), the secondary permission determining unit 236 determines whether the use of the image forming apparatus 2 and the operation of various functions are permitted on the basis of the use permission information from the server 12. When the use of the image forming apparatus 2 and the operation of various functions are permitted, the process proceeds to S132. When the use of the image forming apparatus 2 and the operation of various functions are not permitted, the process proceeds to S134.

In Step 132 (S132), the secondary permission determining unit 236 outputs the secondary permission command to the function setting operation control unit 242, the function execution operation control unit 244, and the apparatus information change operation control unit 246, and the function execution operation control unit 244 and the apparatus information change operation control unit 246 perform a process such that the function which is permitted to be executed in the secondary permission command is made available.

In Step 134 (S134), the permitted state display unit 224 displays information indicating that the use of the image forming apparatus 2 (or a specific function) is not available on the UI device 180.

As described above, the use permission information is provided for each user. However, the use permission information may be provided for each "group" including plural users.

In the above-mentioned description, the server 12 stores the use permission information for each image forming apparatus. However, the server 12 may store one use permission information item applied to all image forming apparatuses. In this case, the request information (authentication request) does not need to include the apparatus identification information.

In the above-mentioned description, the primary permission determining unit 232 receives the use permission information including the user authentication information and the operation authority information from the use permission information storage unit 226. However, the primary permission determining unit 232 may receive the user authentication information and the operation authority information at different times. For example, when the user information receiving unit 220 receives the user information, the primary permission determining unit 232 may receive only the user authentication information from the use permission information storage unit 226 and check the user information and the user authentication information. After the use permission information request unit 228 transmits the request information, the primary permission processing unit 234 may receive the operation authority information from the use permission information storage unit 226 and perform the process.

In the above-mentioned description, the operation control program 22 operates in the image forming apparatus. However, the operation control program 22 may operate any apparatus, such as a scanner, a facsimile, or a computer terminal which is likely to be used by plural users.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An apparatus with a single function or a plurality of functions, comprising:
   a user information receiving unit that receives user information about a user in response to an operation by the user;
   a request unit that requests use permission information, indicating whether the user is permitted to use the function, from a server which stores the use permission information;
   a receiving unit that receives the use permission information transmitted from the server in response to the request from the request unit;
   a memory that stores the received use permission information;
   a user permission determining unit that performs a first determination process of determining whether the user is permitted to use the function on the basis of the user information received by the user information receiving unit and the user permission information which has been stored in the memory before the user information is received and a second determination process of determining whether the user is permitted to use the function on the basis of new user permission information which is received by the receiving unit in response to a request from the request unit and the user information after the first determination process, wherein the new user permission information is different from the user permission information; and an operation controller that, when the determining unit determines that the use of the function is permitted in the first determination process, performs control such that operations other than a predetermined operation among the operations related to the function which is permitted to be used are only available before the second determination process is performed by the determining unit and, only when it is determined that the function whose use is determined to be permitted in the first determination process by the determining unit is also permitted to be used in the second determination process, performs control such that the user is permitted to use all operations of the function.

2. The apparatus according to claim 1, wherein, when it is determined that the function whose use is determined to be permitted in the first determination process by the determining unit is not permitted to be used in the second determination process by the determining unit, the operation control unit performs control such that the user is prohibited from using any operation of the function.

3. The apparatus according to claim 2, wherein the predetermined operation includes an operation for performing the function.

4. The apparatus according to claim 1, wherein the predetermined operation includes an operation for performing the function.

5. A system comprising:
an apparatus with a single function or a plurality of functions; and
a server that stores use permission information indicating whether a user is permitted to use the function of the apparatus,
wherein the apparatus includes:
a user information receiving unit that receives user information about the user in response to an operation by the user;
a request unit that requests the use permission information from the server;
a receiving unit that receives the use permission information transmitted from the server in response to the request from the request unit;
a memory that stores the received use permission information;
a user permission determining unit that performs a first determination process of determining whether the user is permitted to use the function on the basis of the user information received by the user information receiving unit and the user permission information which has been stored in the memory before the user information is received and a second determination process of determining whether the user is permitted to use the function on the basis of new user permission information which is received by the receiving unit in response to a request from the request unit and the user information after the first determination process, wherein the new user permission information is different from the user permission information; and an operation controller that, when the determining unit determines that the use of the function is permitted in the first determination process, performs control such that operations other than a predetermined operation among the operations related to the function which is permitted to be used are only available before the second determination process is performed by the determining unit and, only when it is determined that the function whose use is determined to be permitted in the first determination process by the determining unit is also permitted to be used in the second determination process, performs control such that the user is permitted to use all operations of the function.

6. A non-transitory computer readable medium storing a program that causes a computer of an apparatus with a single function or a plurality of functions to function as:
a user information receiving unit that receives user information about a user in response to an operation by the user;
a request unit that requests use permission information, indicating whether the user is permitted to use the function, from a server which stores the use permission information;
a receiving unit that receives the use permission information transmitted from the server in response to the request from the request unit;
a memory that stores the received use permission information;
a user permission determining unit that performs a first determination process of determining whether the user is permitted to use the function on the basis of the user information received by the user information receiving unit and the user permission information which has been stored in the memory before the user information is received and a second determination process of determining whether the user is permitted to use the function on the basis of new user permission information which is received by the receiving unit in response to a request from the request unit and the user information after the first determination process, wherein the new user permission information is different from the user permission information; and an operation controller that, when the determining unit determines that the use of the function is permitted in the first determination process, performs control such that operations other than a predetermined operation among the operations related to the function which is permitted to be used are only available before the second determination process is performed by the determining unit and, only when it is determined that the function whose use is determined to be permitted in the first determination process by the determining unit is also permitted to be used in the second determination process, performs control such that the user is permitted to use all operations of the function.

* * * * *